UNITED STATES PATENT OFFICE.

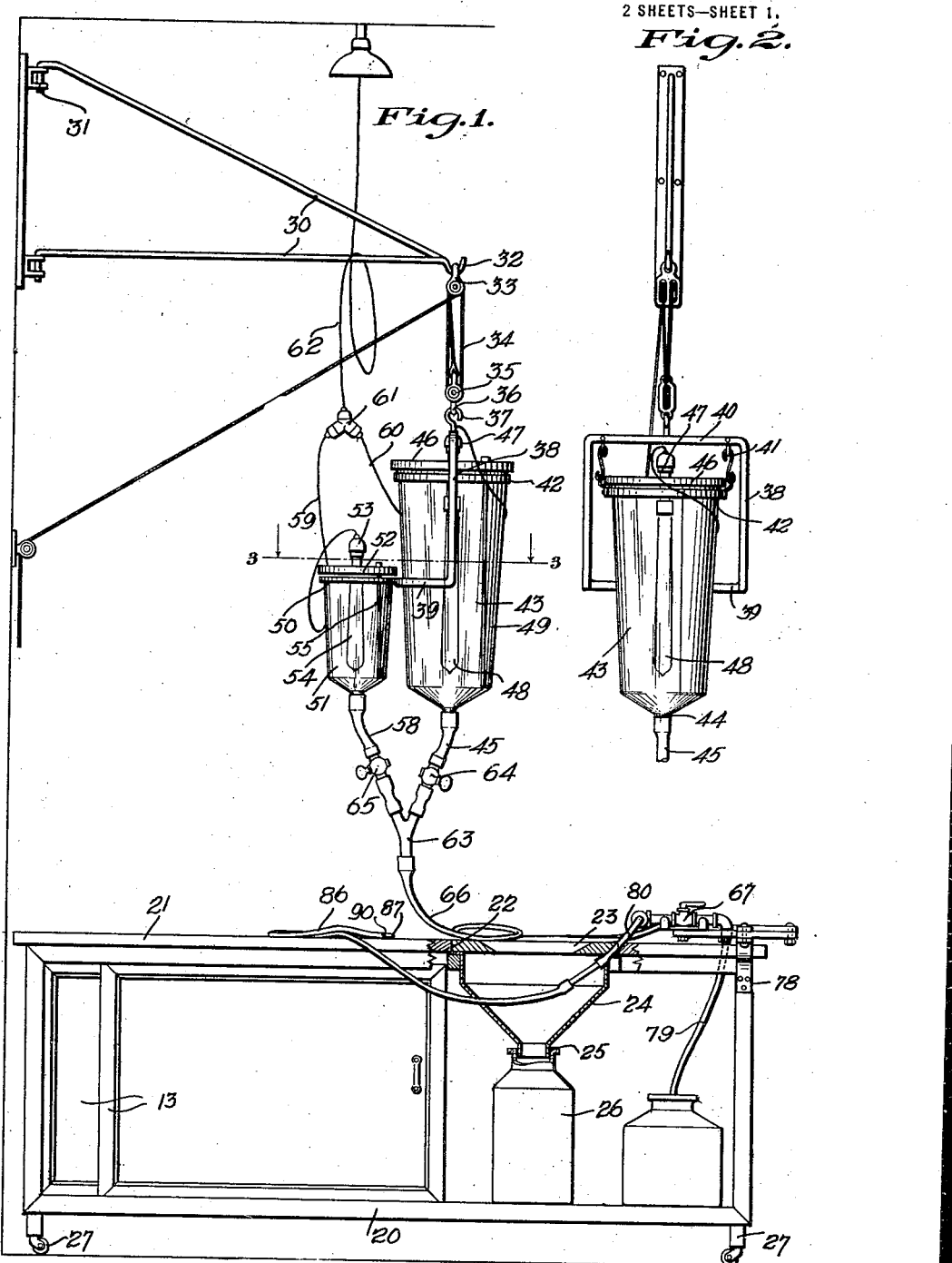

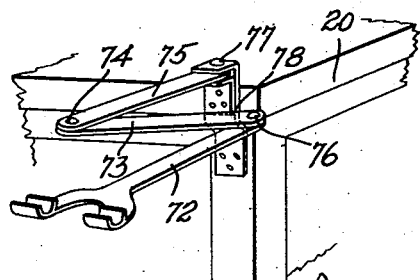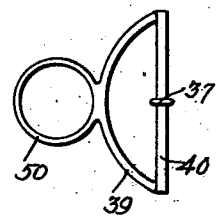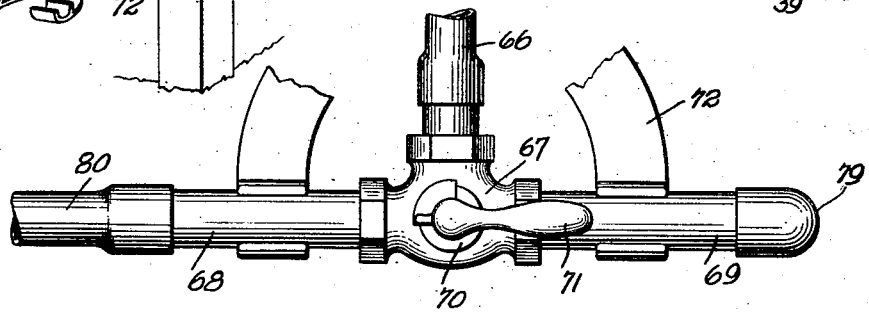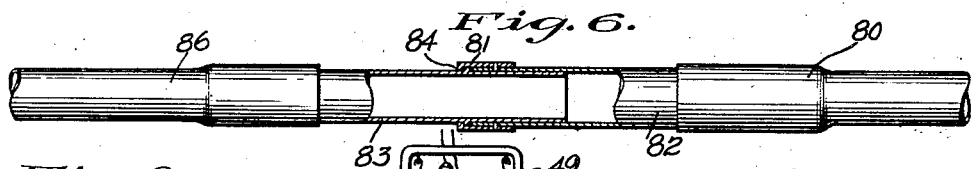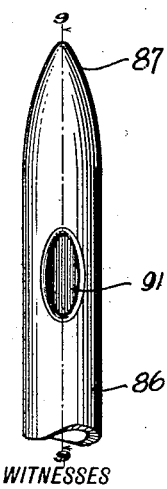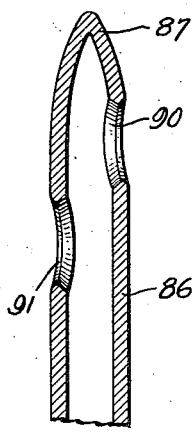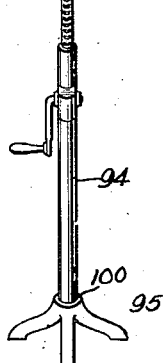

OSCAR BATO SCHELLBERG, OF NEW YORK, N. Y.

REISSUED

MEDICAL APPARATUS FOR USE IN PROCTOTHERAPY.

1,425,420.  Specification of Letters Patent.  Patented Aug. 8, 1922.

Application filed April 22, 1921. Serial No. 463,702.

*To all whom it may concern:*

Be it known that I, OSCAR BATO SCHELLBERG, a citizen of the United States, and a resident of the city of New York, borough of Manhattan, in the county and State of New York, have invented a new and Improved Medical Apparatus for Use in Proctotherapy, of which the following is a full, clear, and exact description.

The present invention relates to new and useful improvements in medical appliances, and it pertains more particularly to apparatus for treating diseases and infections of the colon and alimentary canal.

It is one of the primary objects of the invention to provide apparatus which will serve to remove intestinal flora and feces from the colon.

It is a further object of the invention to provide means which in its action will remove all obstructions and clean all pockets of the colon, and, at the same time, provide a device by means of which antiseptics and other medications may be applied.

It is a still further object of the invention to construct a device, the use of which permits of the planting of various bacilli.

It is a still further object of the invention to construct an apparatus, the use of which permits of a thorough cleansing of the several passages and is capable in use of insertion to a point where the cecum may be treated.

With the above and other objects in view, reference is had to the accompanying drawings, in which—

Figure 1 is a view in elevation partly in section of the complete device;

Fig. 2 is a detail view in elevation taken at right angles to Fig. 1;

Fig. 3 is a transverse sectional view taken on the line 3—3 of Fig. 1;

Fig. 4 is a detail perspective view of a bracket for supporting a portion of the device;

Fig. 5 is a detail top plan view of the controlling means of the device;

Fig. 6 is a detail sectional view of the universal coupling of the liquid tube;

Fig. 7 is a view in elevation of a portable device;

Fig. 8 is a detail view in elevation partly broken away of the injector tube;

Fig. 9 is a longitudinal sectional view of said tube.

Referring more particularly to the drawings, the reference character 20 designates an operating table and said operating table is in the form of a cabinet provided with sliding doors 14. The table is provided with a mattress or the like 21, and said mattress extends throughout a portion of the length of the table and terminates at a point indicated by the reference character 22. The reference character 23 designates an opening in the top of the table and said opening communicates with a hopper or the like 24, the lower end of which is reduced as shown at 25, and adapted to be received within the open end of a receptacle 26. The operating table 20 is mounted upon casters or the like 27 in order that the same may be readily portable from place to place as desired.

The reference character 30 designates a bracket pivotally mounted as at 31 to a wall or other suitable support. This bracket has a hooked end 32 and mounted in said hooked end 32 is a block or the like 33. Passing around this block 33 is a reeving of rope or the like 34, and said rope 34 passes around a lower block 35 provided with an eye 36. Secured in the eye 36 by means of a hook or the like 37, is a frame 38, substantially rectangular in form and provided with a curved offset portion 39. Supported from the top bar 40 of the frame 38, by means of hooks or the like 41, is a ring 42, and suspended in said ring is a container 43 which container has an outlet 44 to which is attached a length of rubber hose or other suitable tubing 45. This receptacle 43 is closed by means of a cover 46 and carried by the cover 46 is the socket 47 of a lamp 48 mounted interiorly of the receptacle. As more clearly shown in Fig. 3, the receptacle 43 is received within the curved offset portion 39 of the frame 38, and said receptacle preferably rests against the same in order that the receptacle may be steadied in a vertical position.

Mounted within the receptacle 43 and carried by its cover, is a thermometer 49, by means of which a reading of the temperature of the liquid contained in the receptacle 43 may be had. Extending from the circular offset portion 39 of the bracket 40, is a circular bracket 50, and mounted in said circular bracket 50 is a receptacle 51. This receptacle 51 has a cover 52 and mounted in the cover 52 is a lamp socket 53 which forms the means for mounting an incandescent lamp 54 within the receptacle 51. The reference character 55 designates a thermometer carried by the cover 52 of the receptacle 51 and said thermometer is employed for giving a reading of the temperature of the liquid contained in the receptacle 51. Leading from the lamp socket 47 is a wire 60, and leading from the lamp socket 53 is a wire 59, said wires 59 and 60 leading to a suitable fixture 61 to which a suitable source of power 62 is attached. Leading from the receptacle 51 is a tube 58, and this tube together with the tube 45 heretofore mentioned, is connected to a Y-coupling 63. Mounted in the tube 45, is a stop cock 64, and mounted in the tube 58 is a stop cock 65, by means of which the liquid from either of the receptacles 43 and 51 may be cut off.

Connected to the Y-coupling 63 is a flexible tube 66 and said flexible tube is connected to a three-way valve 67. The three-way valve has two branches 68 and 69 controlled by means of a handle 71. This valve is carried by a suitable supporting arm 72, pivotally mounted as at 76 to an arm 77, which in turn is pivotally connected as at 74 to the arm 75. The arm 75 is pivotally connected to a bracket 77 secured as at 78 to the operating table 20. By this construction it is apparent that the three-way valve 67 is adjustable in a horizontal plane with relation to the operating table 20. Connected to the branch 69 of the three-way valve 67, is a tube 79, and said tube 79 is adapted to act as a drain for said three-way valve. Connected to the branch 68 of the three-way valve 67, is a tube 80, and said tube 80 is adapted to convey the liquid from the receptacles 43 and 51 dependent upon the position of their respective cocks 64 and 65 to the parts to be treated.

As more clearly shown in Fig. 6, the tube 80 has mounted in its free end a pipe section 82, and said pipe section 82 is adapted to telescopically receive a pipe section 83. The pipe section 83 is provided with a shoulder or annular bead 84, and engaging said shoulder or annular bead, is a collar 81, which collar is rigidly carried by the pipe section 82. By this construction it is apparent that the pipe section 83 is capable of rotation with respect to the pipe section 82, and this operation is permitted without a leakage of the liquid passing through the two pipe sections 82 and 83.

Secured to the pipe section 83 is a flexible tube or injector 86, and this tube or injector 86 is shown specifically in Figs. 8 and 9. This tube 86 has its entrant end tapered or pointed as indicated by the reference character 87, which end 87 is closed. The tube 86 is provided adjacent its closed end 87 with an opening 90, and diametrically opposite to the discharge opening 90, is a discharge opening 91, which latter opening is positioned to the rear of the opening 90. This tube 86 is preferably formed of rubber of a soft nature and its walls are formed of sufficient thickness to provide a certain degree of rigidity which permits of the injection of the tube to the parts to be treated.

The device operates in the following manner:

The receptacle 43 contains a solution at body temperature and this solution is adapted to be introduced to the colon and intestines as follows: The tube is inserted after which the cock 64 is opened, it being understood that the cock 65 is closed. The operating handle 71 of the three-way valve 67 is now thrown to permit of the liquid passing from the receptacle 43 by means of the pipe connection 45, Y-coupling 63, tube connection 60, three-way valve 67, tube 80, to the entrant tube 86. From the entrant tube 86, the liquid discharges through the openings 90 and 91, and the washing begins. After the washing operation, the valve 70 of the three-way valve 67 is thrown to cut off communication with the tube 66 and the cock 64 is closed. As the communication between the tube 66 and the entrant tube 86 is cut off, communication between the entrant tube 86 and the drain tube 79 through the three-way valve 67 is established, which allows the solution to drain from the colon into the receptacle 26, as more clearly shown in Fig. 1.

In the above-described manner the liquid is again permitted to flow from the large receptacle 53 which dilates the colon and during this dilation of the colon the tube is passed therethrough as the water flows. By a suitable manipulation of the apparatus in the above-described manner, intestinal interlining adhesions in the colon are destroyed, and pockets containing intestinal flora and feces, and all obstructions are removed. By dilating the colon and inserting the tube simultaneously with the dilation of said colon, it is possible to insert the tube to the point where it will reach the cecum.

Owing to the peculiar construction of the tube, i. e., its pointed or tapered end of a more or less pliable nature, the same may elevate the intestines and pass therethrough without injury thereto. As the tube 86 is inserted it is given a slight rotary motion, and this motion is permitted owing to the coupling between the tubes 80 and 86 heretofore described and shown in Fig. 6.

By the use of this same apparatus the injurious bacteria may be destroyed and in carrying out this operation the small receptacle 51 is adapted to contain a solution of greater temperature than that contained in the larger receptacle which solution is adapted to be employed as an antiseptic or any medication.

In proceeding with this operation after the tube has been passed as far as possible, the stop cock 64 is closed and the stop cock 65 is opened, after which the liquid contained in the small receptacle 51 will pass by way of the tube 66, three-way valve 67 and tube 85 to the discharge openings 90 and 91 thereof. This liquid is applied in the same manner as above described.

In addition to the above operation this apparatus is particularly useful in the planting of bacilli, such as bacilli bulgaricus, bacillus acidophilous, and other beneficial bacilli. In using the device for planting bacilli, the foregoing operations are carried out except that the bacilli to be planted is carried in suspension in a liquid employed.

In Fig. 7 is shown a portable device and in this form of the invention the frame 38 is supported upon a standard 93, which in turn is adjustably mounted in a tubular standard 94, and said tubular standard 94 is mounted upon a suitable standard 95. By this construction the receptacles 43 and 51 are portably supported instead of being suspended as in the form shown in Fig. 1.

By forming a screw thread or similar removable connection at the point 100 between the tubular standard 94 and the standard 95, in order that the same may be detachable one from the other, and removing the standard 93 from the tubular standard 94, it is apparent that the device shown in Fig. 7 is readily knocked down to render the same transportable.

I claim:

1. A device of the character described comprising a bracket, a rectangular frame having a portion thereof bent at right angles to the main portion to provide means for supporting a plurality of containers, a container suspended in one portion of said rectangular frame, a container rigidly supported in the other portion of said rectangular frame, and means for adjustably supporting said frame relative to the bracket, substantially as described.

2. An apparatus for carrying out surgical operations comprising a bracket, a frame, means for adjustably securing said frame to the bracket, a plurality of receptacles mounted in said frame, a fluid duct leading from each of said receptacles and terminating in a common fitting, a three-way valve, a duct leading from said fitting to said three-way valve, a second duct leading from said three-way valve and adapted for application to a patient, and a third duct leading from said three-way valve, said third-mentioned duct adapted to be connected with the second-mentioned duct to discharge the contents therefrom and create a vacuum therein, as and for the purpose set forth.

3. A device of the character described comprising a bracket, a substantially rectangular right-angular frame having two receptacle-receiving portions, means for suspending a receptacle in one of said receptacle-receiving portions, means for rigidly supporting a receptacle in the other of said receptacle-receiving portions, and means for adjustably suspending said receptacle-supporting frame relative to the bracket, substantially as described.

4. A device of the character described comprising a supporting bracket, a plurality of receptacles, means for carrying the contents of the receptacles to a common discharge, and means for supporting said receptacles in elevated position, said supporting means comprising a frame having a vertical portion and a right-angular horizontally disposed portion, said right-angular horizontally disposed portion being curved to receive one of said receptacles, the other of said receptacles being carried by the vertical portion of said frame.

OSCAR BATO SCHELLBERG.